Aug. 26, 1947.   D. H. PECKHAM   2,426,579
PROTECTIVE MEANS FOR CARRIER WAVE TRANSMITTING SYSTEMS
Filed Aug. 4, 1944
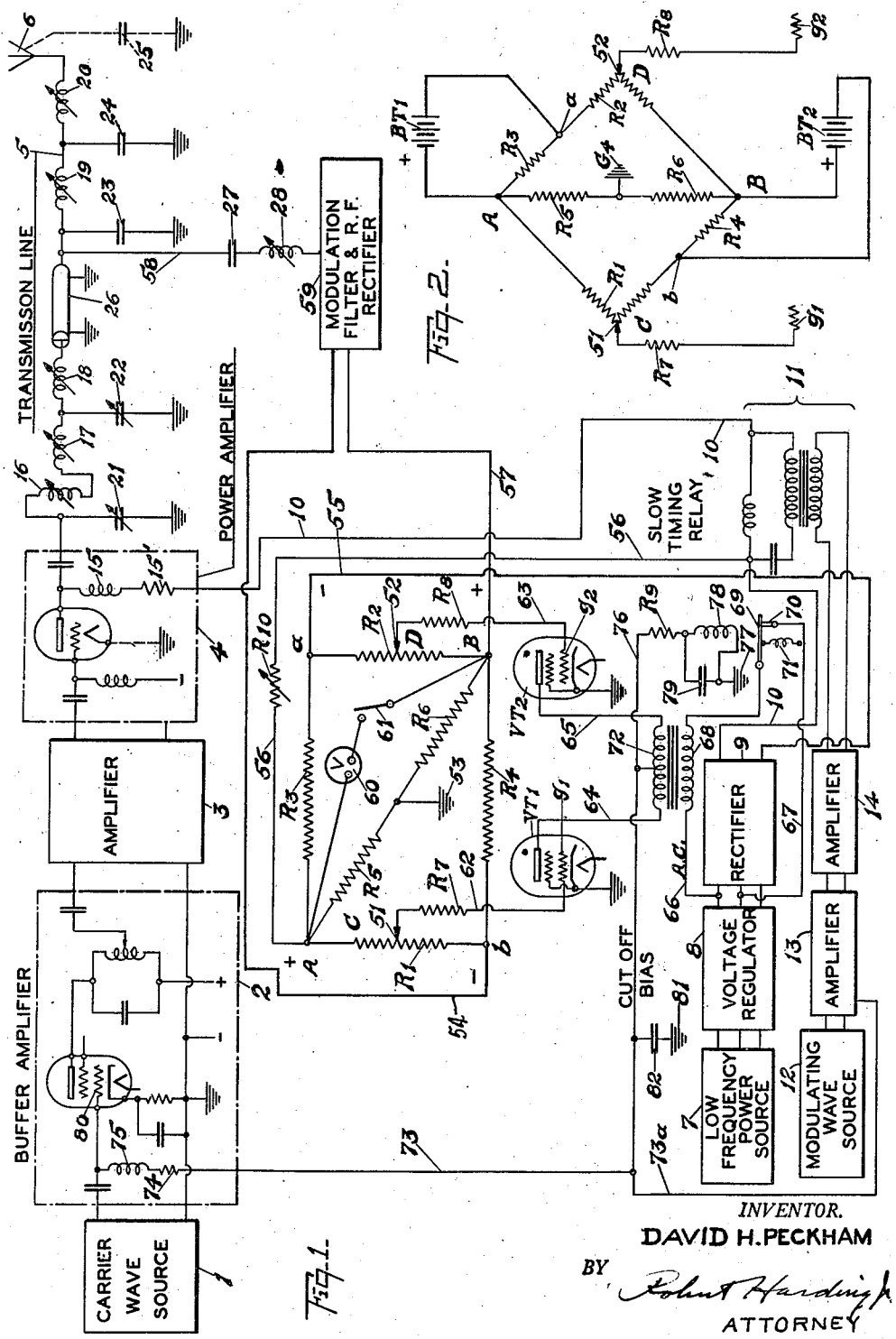
INVENTOR.
DAVID H. PECKHAM
BY
*Robert Harding Jr.*
ATTORNEY

UNITED STATES PATENT OFFICE 2,426,579

PROTECTIVE MEANS FOR CARRIER WAVE TRANSMITTING SYSTEMS

David H. Peckham, Madison, N. J., assignor to Federal Telephone and Radio Corporation, New York, N. Y., a corporation of Delaware Application August 4, 1944, Serial No. 548,085

14 Claims. (Cl. 250—17)

This invention relates to improvements in protective means for carrier wave transmitting systems, particularly those suitable for radio transmitter systems.

It is old in the art to provide protective means for cutting off the carrier wave from the transmitter circuit in case of an abnormal energy change in any part of the system such as happens when an arc or other short circuit path occurs in the transmission system due to a lightning discharge or other cause. However, such previously known protective devices involve apparatus having moving mechanical parts which are limited in speed of response, due to the inherent enertia of the moving parts, with the result that there occurs more of a persistency of the arc or short circuit before the carrier wave can be cut off than is desirable in the art.

In such prior protective means it has been common to restore the system to its operative condition by again supplying the carrier waves to the system, and the apparatus of the prior art, although relatively slow in cutting off the carrier wave from the system, has been entirely satisfactory in restoring such wave to the transmission system, because a relatively slow restoration gives time for the arc or short circuit to be extinguished or abolished after the carrier wave is cut off and before the carrier wave again enters the requisite elements of the transmitting system.

It is the principal object of the present invention to provide means which will cut off the carrier wave from the system substantially instantaneously.

Since it is important that the carrier wave be not supplied again too quickly to the system, but only after a slight interval, a further object of the present invention is to provide protective means for transmission circuits which, while cutting off the carrier wave substantially instantaneously, will, however, only restore such carrier wave to the system after a predetermined interval such as has been found necessary in actual practice.

While the exclusion of the carrier wave from the transmission system will generally be satisfactory to extinguish the arc or abolish a short circuit path, it is advantageous to suppress the supply of modulation voltages to the transmission system. Therefore, a further object of the invention is to provide simple means for suppressing the modulation voltages simultaneously with the cut off of the carrier wave from the transmission system.

With these general objects in view and some others which will be apparent to those skilled in the art from the description hereinafter, the invention consists in a protective system free from moving mechanical parts in the cut off devices and the consequent delay due to the inertia of such parts, and in the best embodiment of the invention not immediately self-restoring. More specifically considered, the invention consists in a protective system employing a normally balanced bridge having one arm energized from a source of uniform direct current having a predetermined value. While this may be supplied by any suitable means, in the best embodiment of the invention this current is conveniently obtained from the power source which supplies plate voltage to the final amplifier. Another non-adjacent arm of the bridge is energized by a direct current proportional to the power in the transmission line, such bridge having suitable balancing resistances as more fully explained hereinafter. The protective system also comprises a pair of rectifier tubes having grids biased by voltages derived from the bridge circuit system, such tubes being energized in a suitable way. The plate circuits of these rectifier tubes are arranged to effect the bias of a grid of the transmitter amplifying system through which the carrier wave passes to the transmission line, so that upon unbalancing the bridge the tubes will act to give a cut off bias on such grid of the amplifier system, which in the best embodiment of the invention is the grid of the first amplifier to receive the carrier wave from its source, whereby the carrier wave cannot reach the transmission line.

Also it is a further feature of the invention that the same cut off bias may also be applied to the grid of the modulation amplifier which first receives the energy from the modulating wave source, whereby the modulating voltages supplied to the plate of the last amplifier are suppressed.

It is an important feature of the best embodiment of the present invention that the rectifier tubes are of the gaseous type, which when tripped by the unbalancing of the bridge, continue to supply the cut off bias until the plate currents of the tubes are cut off, so that any change of the bias of the tube grids will not affect the cut off of the carrier wave.

A further important feature of the present invention consists in the use of mechanical means, having moving parts with some inertia and therefore delayed actions, to stop the action of the rectifier tubes and thereby restore the carrier wave to the transmission system.

By the use of a protective system embodying a bridge, a pair of gaseous tubes and a relay, it becomes practicable to obtain the highest possible speed of action in cutting off the carrier current in case of any arc or short circuit in the transmission system, and at the same time to provide a predetermined delay in restoring the system to its operative condition by readmission of the carrier wave, and thereafter again energizing the plate circuits of the gaseous tubes to restore the tubes to normal condition.

Of course, it is to be understood that the timing action of the relay due to its sluggish movement is such that the transmission system is very quickly restored to operation but it is relatively slow as compared with the practically instantaneous action of the gaseous tubes in cutting off the carrier wave from the transmission system, which, as is known to those skilled in the art, is necessary in order to extinguish an arc or suppress a short circuit path in the transmission system.

The invention will now be described in detail, in its best embodiment, in connection with a typical radio transmitter employing a carrier wave, reference being made to the accompanying drawings, in which Fig. 1 is a diagrammatic view of a radio transmitter system of a usual type, illustrating in a generalized way the elements of such a system and their connections, and also illustrating the elements and connections of the protective system embodying one form of the present invention suitable for use with such radio transmitter system, and Fig. 2 is a diagram hereinafter referred to in explanation of the special bridge system employed by applicant.

Referring to Fig. 1, a suitable source of carrier waves is indicated at 1. This may be and generally is a crystal controlled carrier wave oscillator with its usual circuits, tuning elements and energizing means, which are well known in the art and therefore need not be specifically described here. The source 1, supplies radio frequency waves to a suitable multistage amplifier system, which comprises a plurality of amplifiers, three being indicated in the drawing, namely, a buffer amplifier, indicated at 2, a pre-stage amplifier, indicated at 3, and a power amplifier, indicated at 4.

The source 1 of carrier waves supplies radio frequency carier waves to the buffer amplifier stage 2, which has its output coupled with the pre-amplifier stage 3, whose output, in turn, supplies carrier wave excitation to the control grid of the power amplifier stage 4, whose vacuum tube element may be of any class of radio frequency amplifiers, though in the art heretofore it has been common to employ a vacuum tube element of the class C type, characterized by the flow of space current through the tube for less than one-half the period of each carrier wave cycle, due to the fact that the control grid is biased so negatively.

Suitable means for supplying a substantially constant high voltage direct current to the anode of the tube of amplifier 4 is provided. In the present example, and as usual, the means comprises a low frequency power source, indicated at 7, which may have a frequency, for example, of 60 cycles, the said source, as usual, being of substantially but not entirely constant voltage.

In order to minimize the slight fluctuations in voltage of the source 7, a suitable voltage regulator is employed, as indicated generally at 8, and the substantially and almost entirely constant voltage output of 8 is coupled to a rectifier of the usual type indicated at 9, whereby a substantially constant high voltage direct current is obtained. The negative side of the rectifier is grounded through a bridge circuit, to be later described, and the positive side is connected over conductor 10 to the plate or anode of the power amplifier 4, the circuit being completed through the anode, the grounded cathode, and back to the grounded negative of the rectifier through the bridge circuit.

In the path of the current through conductor 10 there is included a modulating wave transformer coupling arrangement of the usual type, indicated at 11, which serves to impress on conductor 10 modulations derived from a suitable source, indicated at 12, and amplified through two stages of amplification indicated at 13 and 14, respectively, whereby the modulated waves in conductor 10, are transmitted to the anode-cathode circuit of amplifier 4.

In the path of the current through conductor 10 there is included a high frequency choke coil 15, which keeps the carrier wave frequency current from reaching the coupling arrangement 11 and other parts of the modulating frequency circuit. Also, a resistance 15' may be included if required.

The modulated carrier wave output of the power amplifier 4 is connected through a suitable transmission line, indicated generally at 5, to an antenna indicated at 6.

The transmission line indicated in the drawing includues a plurality of adjustable inductive reactance elements, indicated at 16, 17, 18, 19, and 20, while in shunt between conductor 5 and the ground there are provided a plurality of capacitive reactance elements 21, 22, 23, and 24. Also, the capacity between the antenna and ground must be considered and therefore is indicated in dotted lines, at 25 as a shunt path to ground which includes a capacitive reactance element.

Two of the capacitive reactance elements, namely, 21 and 22, are usually adjustable, as indicated by the inclined arrows.

It is customary to provide the conductor 5, at least at one part, with an electrostatic shield, indicated somewhat shortened at 26, which is grounded at each end, as shown.

The system thus far explained is one form of a well known radio broadcasting transmitter, which may frequently be put out of action and sometimes have its equipment injured by lightning discharges or other impulses or causes which may start a sustained arc or short circuit between parts of the radio transmitter circuit, thereby causing a prolonged interruption, or at least, a mutilation of the radio transmission.

For the purpose of entirely avoiding or at least minimizing the injurious results of such arcs or short circuits, the hereinafter described protective means is employed in combination with a carrier wave transmission system.

The protective means comprises, as an important element, a special type of bridge circuit system the basic principles of which will first be explained in connection with the diagram, Fig. 2, in which is indicated a bridge having four arms whose respective junction points are indicated at A, B, C, and D, respectively. Adjacent to points C and D, respectively, are potentiometer resistances $R_1$, $R_2$, respectively, along which may be adjusted suitable contact devices, indicated at 51 and 52, respectively, which are conductively connected to the grids $g_1$, and $g_2$ of corresponding rectifier tubes.

That arm of the bridge which extends between points A and D includes a resistance $R_3$ and so much of the potentiometer resistance $R_2$ as lies between the contact device 52 and the junction A. The next adjacent arm of the bridge which extends between points D and B includes so much of the potentiometer resistance $R_2$ as lies between the contact device 52 and the point B. The third arm of the bridge, which extends between the points B and C, includes a resistance $R_4$ and so much of the potentiometer resistance $R_1$ as lies between the contact device 51 and the point B. The fourth arm of the bridge, which extends between the points C and A includes so much of the potentiometer resistance $R_1$ as lies between the contact device 51 and the point A.

The points A and B of the bridge are in conductive connection through two equal resistance elements $R_5$ and $R_6$ and are grounded at an intermediate point, the common ground being indicated at $G_4$.

For the purpose of explanation it is assumed that a positive direct current voltage is impressed, as, for example, by a battery $BT_1$ between the point A and the point $a$, which is the juncture of the resistances of the arm A—D, and it is also assumed that a positive direct current voltage is impressed between point B and a point $b$ which is the juncture of the resistances of the arm C—B, as, for example, by a battery $BT_2$.

The direct current from the positive pole of battery $BT_1$ will flow to point A of the bridge, will then divide and pass through three different parallel circuits: that containing the resistance $R_3$; that containing the resistances $R_5$ and $R_6$, grounded at $G_4$ between the two resistances, and the potentiometer $R_2$; and that containing the potentiometer $R_1$, the resistance $R_4$, and the potentiometer $R_2$.

The flow of the current from battery $BT_2$ to point B of the bridge, and back to the battery $BT_2$ will be understood from the description hereinbefore given as to the flow of current from battery $BT_1$.

By adjusting the contact devices 51 and 52 along their respective potentiometer resistances $R_1$ and $R_2$ points will be found where the potential on 51 will be equal to that on 52, and will be the proper negative potenial to impress on the grids of the respective rectifier tubes, such grids being indicated on the diagram Fig. 2 at $g_1$ and $g_2$, respectively. It is assumed in this case that the rectifier tubes are matched and therefore utilize identical voltages on their grids to prevent flow of plate currents in said tubes. However, it is an important advantage of the present invention that the contact devices 51 and 52 may be adjusted on their respective potentiometer resistances to give sufficiently different voltages on the grids to permit the use of rectifier tubes which are not matched, and at the same time not injuriously affect the operation of the bridge.

Referring now to Fig. 1 the bridge is shown in a somewhat altered configuration, so that the potentiometer resistances $R_1$ and $R_2$ are each straight instead of bent at an angle, as in Fig. 2. The points A, B, C, and D, Fig. 1, correspond to the points lettered the same and described in connection with Fig. 2, and so also as to points $a$ and $b$.

The resistances are identified in the same way as in Fig. 2. The ground, however, is identified in Fig. 1 by the reference numeral 53, corresponding to the symbol $G_4$.

Instead of the batteries referred to in the description of Fig. 2, in the actual apparatus, the direct current voltages impressed on points A and B are otherwise obtained, as will now be described.

The junction point A of the bridge is connected by a conductor 56 to the conductor 10, as indicated in the drawing, at any point in advance of the coupling arrangement 11 so that an unmodulated current is supplied to conductor 56, of a predetermined constant value. The conductor 56 may include a variable resistance $R_{10}$, if desired, whereby the current in the conductor may be adjusted to its desired constant value. The point $a$ is connected to the other terminal of the rectifier 9. The junction point B of the bridge is connected to a source of direct current which varies with the power in the transmission line 5, by a conductor 57. The negative side of this source is connected to the point $b$ on the bridge over the conductor 55. While there are various ways of providing such a source of direct current, a simple and convenient means is to connect a modulation filter and high frequency rectifier apparatus to the transmission line 5, at a suitable point, as, for example, outside the shield 26, by a conductor 58, which includes a condenser 27 and a variable inductance 28.

The path from the transmission line 5 to ground at the bridge has a very high resistance and will not pass a direct current on account of the condenser 27. It does pass an exceedingly small modulated radio frequency current to the modulation filter and radio frequency rectifier, indicated generally at 59, which apparatus being old and well known need not be specifically described. The filter removes the modulations of the modulated carrier wave current and the radio frequency rectifier delivers a substantially uniform direct current which passes over conductor 57 to point B of the bridge, whence it passes through the bridge circuit back to the rectifier 59.

The direct current from conductor 10 passes over the conductor 56 to the junction point A of the bridge and from there passes through the bridge circuit and back to the rectifier 9 over the conductor 54.

The bridge is so dimensioned as to the resistances of its arms and ground connection resistances $R_5$, $R_6$, that during normal operation of the radio transmitter system the points A and B of the bridge will be at the same potential, which can be determined by a voltmeter connected to said points. Such a voltmeter is indicated at 60 with a key 61, to open or close the voltmeter branch circuit. By adjustment of the variable inductance 28 the current supplied to junction B over conductor 57 may be brought in proper relation to the current supplied to junction A over conductor 56. If desired, of course, the variable resistance $R_{10}$, included in conductor 56, may be used to assist in adjusting the relation of the two currents.

At $VT_1$ and $VT_2$ are indicated two gaseous ionizable tubes, such as the well known thyratrons. The control grid $g_1$ of tube $VT_1$ is connected by a conductor 62 to the contact device 51 through a resistance element $R_7$, and the control grid $g_2$ of the tube $VT_2$ is connected by a conductor 63 to the contact device 52 through a resistance $R_8$. By adjusting the movable contact devices 51 and 52 along their respective resistances or potentiometers $R_1$, $R_2$, the required negative voltage may be provided on the respective grids to maintain the gaseous tubes free of space current and these voltages may be made suitable for the tubes, even if unmatched.

The plates of the gaseous tubes are connected by conductors 64 and 65, respectively, to a source of alternating current. In the present example, this current is taken from the voltage regulator output over two conductors, indicated at 66 and 67, which lead to the opposite ends of a transformer primary 68, the conductor 67 being controlled by the switch lever 69 of a relay, which lever is biased toward a contact 70 by an adjustable spring 71. The transformer secondary 72 has its opposite ends connected to the conductors 64 and 65 which lead to the respective plates, as hereinbefore stated.

The secondary 72 of the transformer is tapped at is electrical center, as shown, and from this tap a conductor 73, grounded at 81, through a condenser 82, and containing a resistance 74 as well as an inductance element 75, extends to the conductor of the grid 80 of the first amplifier, in this case the buffer amplifier 2. In that modification of the invention where the modulation voltages are to be suppressed, there may be provided a connection from conductor 73 to the grid of the first amplifier tube of the amplifier 13, which first receives energy from the modulating wave source. Such a connection is shown as a conductor 73a and it is to be understood that the conductive path to the grid of the amplifier may include a resistance and an inductance similar to 74 and 75 used in the connection to the grid conductor of amplifier 2 in the transmission system. These are not shown in the drawing since the amplifier 13 is indicated only by a rectangle. The said amplifier 13 is old and well-known and is analogous to the amplifier 2.

Also, from the aforesaid tap a conductor 76, containing a resistance $R_9$, leads directly to ground 77, through the magnetizing coil 78 of the relay, the coil being in shunt with a condenser 79.

In the best embodiment of the invention the gaseous tubes $VT_1$ and $VT_2$ have suitable means for heating the cathodes (not shown) as usual.

As one example of a very successful protective system for a radio carrier wave transmitter of a type such as illustrated in the drawing and hereinbefore described, it may be noted that the dimensions and characteristics of the elements employed were as follows.

Resistance elements:

| | | | |
|---|---|---|---|
| $R_1$, potentiometer type | | ohms | 50,000 |
| $R_2$ do do | | do | 50,000 |
| $R_3$ do do | | do | 8,000 |
| $R_4$ do do | | do | 8,000 |
| $R_5$ do do | | do | 50,000 |
| $R_6$ do do | | do | 50,000 |
| $R_7$ do do | | megohms | 10 |
| $R_8$ do do | | do | 10 |
| $R_9$ do do | | ohms | 500 |
| Capacity element, 79 | | microfarads | 2 |
| Gaseous tubes, $VT_1$ and $VT_2$, thyratrons | | | R. C. A. 2051 |

The voltages of the direct currents supplied to junction points A and B were 150 volts each.

The relay having the magnetizing coil 78 was a relatively slow acting relay whose coil 78 had a resistance of 700 ohms, and operated with a potential of about 24 volts. The switch lever was biased by a spring whose tension was adjustable within limits.

The operation of the protective system will be obvious to those skilled in the art from an inspection of the drawing, but may be briefly described as follows:

When the transmitter is operating normally, the bridge junctions A and B are at equal potentials, usually about 150 volts each, the currents flowing through conductors 56 and 57 being negligible on account of the relatively high resistances in the bridge.

The contact devices 51 and 52 are adjusted on their respective potentiometer resistances $R_1$ and $R_2$ to give such a bias on their respective tube $VT_1$ and $VT_2$ that the tubes remain out of action, or substantially so, notwithstanding the low frequency alternating voltages from the transformer secondary 72 applied to the plates of said tubes.

If now, an arc or short circuit occurs in the transmitter, thereby causing an abnormal change in voltage in the transmission line, a corresponding alteration in the voltage of the direct current supplied by the radio frequency rectifier 59 takes place, whereupon the bridge is unbalanced and the potentials impressed on the grids of the tubes $VT_1$ and $VT_2$ through the conductors 62 and 63 correspondingly change. This change has what might be called a trigger action, setting either one or the other of the tubes in action to provide a relatively strong space current, which, once started will no longer be controlled by the grid voltage. Immediately pulsatory direct current flows in one or the other of the plate circuits, thereby giving in the conductors 72 and 76 a pulsatory direct current. This gives a cut off voltage bias on the grid of the first amplifier tube of the transmitter and thereby cuts off the supply of carrier waves to the transmitter. This removes the source of energy which would otherwise tend to maintain the arc or short circuit path, and therefore the arc or short circuit disappears after a small interval. During this small interval, one of the tubes $VT_1$ and $VT_2$ remains active to provide a cut off bias voltage on the grid of the first amplifier tube of the transmitter, so that the carrier wave will continue to be cut off until the arc or short circuit disappears. No alteration in the voltages on the plates of tubes $VT_1$ and $VT_2$ due to alterations in the voltage of the direct current obtained from the transmission line over conductor 58 will put the gaseous tubes out of action, until the relay opens its switch lever 69 and cuts the alternating current circuit supplying the potentials on the plates of the gaseous tubes, through the transformer secondary 72.

Since the relay has a predetermined relatively long time of operation, as compared with the instantaneous action of the tubes in cutting off the carrier current of the transmitter, the arc or short circuit in the transmitter which caused the cut off of the carrier wave will have time to die out, before the tubes $VT_1$ and $VT_2$ are put out of operation by the opening of switch lever 69 of the relay. When the alternating current circuit is opened by the relay, the spring closes the switch lever and restores the voltage to the plates of the gaseous tubes. Since the abnormal condition no longer exists at the transmitter the bridge is again in balance and the protective system is re-set to await the next abnormal condition of the transmission line.

It will be understood that the substantially instantaneous cut off of the carrier wave prevents the arc from growing by accumulation of heat, and, hence, it is extinguished easily and more quickly than when allowed time to heat up any parts of the apparatus in its immediate vicinity. In other words, such an arc or short circuit, because of the instantaneous action of the tubes, is extinguished in its incipiency.

Hence, the relay which has been considered as slow in action in order to allow time for the removal of the arc or short circuit may in practice be quick enough to restore the transmitter to operation before any serious interruption of the transmitted message or broadcast has happened.

If, upon cutting the alternating circuit, to stop the action of the gaseous tubes and then closing the said circuit for the purpose of restoring the tubes to their normal condition, the abnormal condition of the transmission line still exists, the bridge will at once provide space currents and the carrier wave will again be cut off, and at a later interval restored by the relay. This indicates a more serious interruption to transmission which may require special attention to the system by the operators. In other words, a chattering of the switch lever 69 will be a signal to the operator that the abnormal conditions are more serious than the automatic restoring action of the protective system can overcome.

In a system wherein the cut off bias is employed not only to cut off the carrier wave, but also to cut off the modulation voltages, the action hereinbefore described as to the suppression of an arc or a short circuit in the transmission system is considerably aided by the suppression of the fluctuating modulation voltages normally applied to the plate of the last amplifier in the transmission system.

Under some conditions the desired substantially instantaneous cut off of the carrier wave from the transmitter can be accomplished by the use of suitable grid controlled vacuum tube rectifiers instead of the gaseous tubes, such as the thyratrons, indicated at $VT_1$ and $VT_2$ in the drawings, but in such case one of the prime advantages is lost, since such other vacuum tubes continue to be controlled by their grids, and a change of grid voltage brought about by fluctuations of voltage in the transmission line may cause somewhat erratic changes of cut off bias in the grid of the first amplifier of the transmission line.

What is claimed is:

1. In a protective system for carrier wave transmission apparatus, comprising a source of carrier waves, amplifier tubes, with grids, for amplifying said carrier waves, and a transmission line arranged to be energized by the amplified carrier waves, the combination, with a bridge circuit system having four arms and a bridge conductor, means for supplying a direct current, whose voltage is a function of the power in the transmission line, to and through one arm of the bridge, means for supplying a direct current, whose voltage is a function of the voltage of the final amplifier plate of the transmission system, to and through a second arm of the bridge non-adjacent to the first named arm, means for controlling the ratio of the voltages of the direct currents to obtain substantially equality of currents, a potentiometer resistance element in each of said first and second arms, respectively, each having a portion serving as a resistance element in an adjacent other arm of the bridge, respectively, to balance the bridge, and resistance elements in the bridge conductor, grounded at their meeting ends, of a pair of rectifier tubes, each having a plate and a grid, an adjustable contact device for each potentiometer resistance element of the bridge, each conductively connected to the respective grid of one rectifier tube, means for supplying a low frequency alternating voltage to the plate of each tube, such voltages being substantially 180° out of phase with each other, a conductor arranged to be energized by the plate currents of both rectifier tubes, and means for impressing on the grid of that amplifier tube in the transmission system which first receives the carrier wave, a cut off voltage derived from the conductor energized by the plate currents.

2. In a protective system for carrier wave transmission apparatus, comprising a source of carrier waves, amplifier tubes, with grids, for amplifying said carrier waves, and a transmission line arranged to be energized by the amplified carrier waves, the combination, with a bridge circuit system having four arms and a bridge conductor, means for supplying a direct current, whose voltage is a function of the power in the transmission line, to and through one arm of the bridge, means for supplying a direct current, whose voltage is a function of the voltage of the final amplifier plate of the transmission system, to and through a second arm of the bridge non-adjacent to the first named arm, means for controlling the ratio of the voltages of the direct currents to obtain substantial equality of currents, a potentiometer resistance element in each of said first and second arms, respectively, each having a portion serving as a resistance element in an adjacent other arm of the bridge, respectively, to balance the bridge, and resistance elements in the bridge conductor, grounded at their meeting ends, of a pair of rectifier tubes, each having a plate and a grid, a contact device for each potentiometer resistance element of the bridge, each conductively connected to the respective grid of one rectifier tube, means for supplying a low frequency alternating voltage to the plate of each tube, such voltages being substantially 180° out of phase with each other, a conductor arranged to be energized by the plate currents of both rectifier tubes, means for impressing on the grid of that amplifier tube in the transmission system which first receives the carrier wave, a cut off voltage derived from the conductor energized by the plate currents, and a relay having its magnetizing coil energized by both plate currents and arranged to terminate the supply of low frequency voltage to the plates of the rectifier tubes.

3. In a protective system for carrier wave transmission apparatus, comprising a source of carrier waves, amplifier tubes, with plates and grids, for amplifying said carrier waves, and a transmission line arranged to be energized by said carrier waves, the combination, with means for developing a direct current proportional to and directly variable with the voltage applied to the final amplifier plate, means for developing a direct current which varies with the power in the transmission line, means for adjusting said direct currents to a normal predetermined ratio, a pair of rectifier tubes, each having a grid and a plate, plate circuits in parallel, each branch including the plate of its respective tube, means for impressing on each plate circuit a low frequency alternating current voltage, said voltages being phased 180° apart, and means for impressing on the grid of the first amplifier a cut off voltage derived from the plate circuits, of a normally balanced bridge system having one arm energized by one of the direct current means and another non-adjacent arm energized by the other direct current means, said bridge system having resistance elements and ground connections whereby said bridge system is in balance when said direct currents have a predetermined ratio of voltages, and adjustable means for deriving separate grid biasing voltages from said non-adjacent bridge arms and impressing each on the grid of its respective tube.

4. In a protective system for carrier wave transmission apparatus, comprising a source of carrier waves, amplifier tubes, with plates and grids, for amplifying said carrier waves, and a transmission line arranged to be energized by said carrier waves, the combination, with means for developing a direct current proportional to and directly variable with the voltage applied to the final amplifier plate, means for developing a direct current which varies with the power in the transmission line, means for adjusting said direct currents to a normal predetermined ratio, a pair of rectifier tubes, each having a grid and a plate, plate circuits in parallel, each branch including the plate of its respective tube, means for impressing on each plate circuit a low frequency alternating current voltage, said voltages being phased 180° apart, and means for impressing on the grid of the first amplifier a cut off voltage derived from the plate circuits, of a normally balanced bridge system having one arm energized by one of the direct current means and another non-adjacent arm energized by the other direct current means, said bridge system having resistance elements and ground connections whereby said bridge system is in balance when said direct currents have a predetermined ratio of voltages, adjustable means for deriving separate grid biasing voltages from said non-adjacent bridge arms and impressing each on the grid of its respective tube, a relay having its magnetizing coil arranged to be energized by the current from both plate circuits, and a switch lever biased to its closed position and arranged to open the plate circuits when the relay coil is energized.

5. In a protective system for carrier wave transmission apparatus, comprising a source of carrier waves, amplifier tubes, with grids, for amplifying said carrier waves, and a transmission line arranged to be energized by the amplified carrier waves, the combination, with a bridge circuit system having four arms and a bridge conductor, means for supplying a direct current, whose voltage is a function of the power in the transmission line, to and through one arm of the bridge, means for supplying a direct current, whose voltage is a function of the voltage of the final amplifier plate of the transmission system, to and through a second arm of the bridge non-adjacent to the first named arm, means for controlling the ratio of the voltages of the direct currents to obtain substantial equality of currents, a potentiometer resistance element in each of said first and second arms, respectively, each having a portion serving as a resistance element in an adjacent other arm of the bridge, respectively, to balance the bridge, and resistance elements in the bridge conductor, grounded at their meeting ends, of a pair of gaseous ionizable rectifier tubes, each having a plate and a grid, a contact device for each potentiometer resistance element of the bridge, each conductively connected to the respective grid of one rectifier tube, means for supplying a low frequency alternating voltage to the plate of each tube, such voltages being substantially 180° out of phase with each other, a conductor arranged to be energized by the plate currents of both rectifier tubes, and means for impressing on the grid of that amplifier tube in the transmission system which first receives the carrier wave, a cut off voltage derived from the conductor energized by the plate currents.

6. In a protective system for carrier wave transmission apparatus, comprising a source of carrier waves, amplifier tubes with grids, for amplifying said carrier waves, and a transmission line arranged to be energized by the amplified carrier waves, the combination, with a bridge circuit system having four arms and a bridge conductor, means for supplying a direct current, whose voltage is a function of the power in the transmission line, to and through one arm of the bridge, means for supplying a direct current, whose voltage is a function of the voltage of the final amplifier plate of the transmission system, to and through a second arm of the bridge non-adjacent to the first named arm, means for controlling the ratio of the voltage of the direct currents to obtain substantially equality of currents, a potentiometer resistance element in each of said first and second arms, respectively, each having a portion serving as a resistance element in an adjacent other arm of the bridge, respectively, to balance the bridge, and resistance elements in the bridge conductor, grounded at their meeting ends, of a pair of rectifier tubes, each having a plate and a grid, a contact device for each potentiometer resistance element of the bridge, each conductively connected to the respective grid of one rectifier tube, means for supplying a low frequency alternating voltage to the plate of each tube, such voltages being substantially 180° out of phase with each other, a conductor arranged to be energized by the plate currents of both rectifier tubes, means for impressing on the grid of that amplifier tube in the transmission system which first receives the carrier wave, a cut off voltage derived from the conductor energized by the plate currents, and a relay having its magnetizing coil energized by both plate currents and arranged when energized to terminate the supply of low frequency voltage to the plates of the rectifier tubes.

7. In a protective system for carrier wave transmission apparatus, comprising a source of carrier waves, amplifier tubes, with grids, for amplifying said carrier waves, and a transmission line arranged to be energized by the amplified carrier waves, the combination, with a bridge circuit system having four arms and a bridge conductor, a modulation filtering and radio frequency rectifying apparatus energized by the transmission line and arranged to deliver direct current to and through one arm of the bridge, means for impressing a direct current voltage on the final amplifier plate of the transmission system, a connection from said voltage impressing means to supply direct current to and through a second arm of the bridge non-adjacent to the first named arm, means for controlling the ration of the voltages of the direct currents to obtain, normally, a substantial equality of said direct currents, a potentiometer resistance element in each of said first and second arms, respectively, each having a portion serving as a resistance element in an adjacent other arm of the bridge, respectively, to balance the bridge, and resistance elements in the bridge conductor, grounded at their meeting ends, of a pair of gaseous, ionizable rectifier tubes, each having a plate and a grid, an adjustable contact device for each potentiometer resistance element of the bridge, each conductively connected to the respective grid of one rectifier tube, means for supplying a low frequency alternating voltage to the plate of each tube, such voltages being substantially 180° out of phase with each other, a conductor arranged to be energized by the plate currents of both rectifier tubes, and means for impressing on the grid of that amplifier tube in the transmission system which first receives the carrier wave, a cut off voltage derived from the conductor energized by the plate currents.

8. In a protective system for carrier wave transmission apparatus, comprising a source of carrier waves, amplifier tubes, with grids, for amplifying said carrier waves, and a transmission line arranged to be energized by the amplified carrier waves, the combination, with a bridge circuit system having four arms and a bridge conductor, a modulation filtering and radio frequency rectifying apparatus energized by the transmission line and arranged to deliver direct current to and through one arm of the bridge, means for impressing a direct current voltage on the final amplifier plate of the transmission system, a connection from said plate voltage impressing means to supply direct current to and through a second arm of the bridge non-adjacent to the first named arm, means for controlling the ratio of the voltages of the direct currents to obtain, normally, a substantial equality of said direct currents, a potentiometer resistance element in each of said first and second arms, respectively, each having a portion serving as a resistance element in an adjacent other arm of the bridge, respectively, to balance the bridge, and resistance elements in the bridge conductor, grounded at their meeting ends, of a pair of gaseous, ionizable rectifier tubes, each having a plate and a grid, a contact device for each potentiometer resistance element of the bridge, each conductively connected to the respective grid of one rectifier tube, means for supplying a low frequency alternating voltage to the plate of each tube, such voltages being substantially 180° out of phase with each other, a conductor arranged to be energized by the plate currents of both rectifier tubes, means for impressing on the grid of that amplifier tube in the transmission system which first receives the carrier wave, a cut off voltage derived from the conductor energized by the plate currents, and a relay having its magnetizing coil energized by both plate currents and arranged when energized to terminate the supply of low frequency voltage to the plates of the rectifier tubes.

9. In a system for suppressing the supply of carrier waves to a transmission line, the combination, with a pair of gaseous, ionizable tubes of the thyratron type having their plates connected in parallel in a plate circuit, of means for impressing an alternating current voltage on said plates, means energized by said plate circuit for cutting off the supply of carrier current to the said transmission line, and relay means energized by said plate circuit for opening the plate circuit and restoring the supply of carrier waves to the transmission line, said tubes having their respective grids impressed with voltages derived from means responsive to abnormal variations in power in said transmission line.

10. In a protective system for carrier wave transmission apparatus, comprising a source of carrier waves, amplifier tubes, with grids, for amplifying said carrier waves, a transmission line arranged to be energized by the amplified carrier waves, and means for supplying modulation voltages to the transmission system, said means including an amplifier tube having a grid, the combination, with a bridge circuit system having four arms and a bridge conductor, means for supplying a direct current, whose voltage is a function of the power in the transmission line, to and through one arm of the bridge means for supplying a direct current, whose voltage is a function of the voltage of the final amplifier plate of the transmission system, to and through a second arm of the bridge non-adjacent to the first named arm, means for controlling the ratio of the voltages of the direct currents to obtain substantial equality of currents, a potentiometer resistance element in each of said first and second arms, respectively, each having a portion serving as a resistance element in an adjacent other arm of the bridge, respectively, to balance the bridge, and resistance elements in the bridge conductor, grounded at their meeting ends, of a pair of gaseous ionizable rectifier tubes, each having a plate and a grid, a contact device for each potentiometer resistance element of the bridge, each conductively connected to the respective grid of one rectifier tube, means for supplying a low frequency alternating voltage to the plate of each tube, such voltages being substantially 180° out of phase with each other, a conductor arranged to be energized by the plate currents of both rectifier tubes, and means for impressing on the grid of that amplifier tube in the transmission system which first receives the carrier wave and on the grid of the amplifier tube of the means for supplying modulation voltages, a cut off voltage derived from the conductor energized by the plate currents.

11. In a protective system for carrier wave transmission apparatus, comprising a source of carrier waves, amplifier tubes, with grids, for amplifying said carrier waves, a transmission line arranged to be energized by the amplified carrier waves, and means for supplying modulation voltages to the transmission system, said means including an amplifier tube having a grid, the combination, with a bridge circuit system having four arms and a bridge conductor, means for supplying a direct current, whose voltage is a function of the power in the transmission line, to and through one arm of the bridge, means for supplying a direct current, whose voltage is a function of the voltage of the final amplifier plate of the transmission system, to and through a second arm of the bridge non-adjacent to the first named arm, means for controlling the ratio of the voltages of the direct currents to obtain substantial equality of currents, a potentiometer resistance element in each of said first and second arms, respectively, each having a portion serving as a resistance element in an adjacent other arm of the bridge, respectively, to balance the bridge, and resistance elements in the bridge conductor grounded at their meeting ends, of a pair of gaseous ionizable rectifier tubes, each having a plate and a grid, a contact device for each potentiometer resistance element of the bridge, each conductively connected to the respective grid of one rectifier tube, means for supplying a low frequency alternating voltage to the plate of each tube, such voltages being substantially 180° out of phase with each other, a conductor arranged to be energized by the plate currents of both rectifier tubes, means for impressing on the grid of that amplifier tube in the transmission system which first receives the carrier wave and on the grid of the amplifier tube of the means for supplying modulation voltages, a cut off voltage derived from the conductor energized by the plate currents, and a relay having its magnetizing coil energized by both plate currents and arranged when energized to terminate the supply of low frequency to the plates of the rectifier tubes.

12. A protective system for carrier wave transmission apparatus having a carrier wave source and an amplifier, comprising a source of reference voltage, means connected to the output of said amplifier to obtain a voltage proportional to a voltage in the circuit thereof, means connected to said amplifier and responsive to changes in the difference between said reference voltage and said output-circuit voltage to shut-off said amplifier when said difference changes through a predetermined amount, and means to restore said last-mentioned means to its normal condition after a predetermined time interval.

13. A protective system for carrier wave transmission apparatus according to claim 12, in which the means responsive to the change in difference between the reference voltage and the voltage from the output circuit of said amplifier comprises a bridge circuit connected therebetween and a pair of discharge devices with their inputs connected to opposite arms of said bridge circuit, whereby one of said devices will operate when the voltage difference has one sense and the other will operate when the voltage difference has the other sense, said discharge devices having a common output circuit adapted to deliver a cut-off bias potential to said amplifier when either one of said devices is operated.

14. A protective system for carrier wave transmission apparatus according to claim 12, in which the means responsive to the change in difference between the reference voltage and the voltage from the output circuit of said amplifier comprises a bridge circuit connected therebetween and a pair of discharge devices with their inputs connected to opposite arms of said bridge circuit, whereby one of said devices will operate when the voltage difference has one sense and the other will operate when the voltage difference has the other sense, said discharge devices having a common output circuit adapted to deliver a cut-off bias potential to said amplifier when either one of said devices is operated and in which the means to restore the amplifier shut-off means is a relay connected in the common output circuit for said discharge devices.

DAVID H. PECKHAM.

REFERENCES CITED

The following references are of record in the file of this patent:

UNITED STATES PATENTS

| Number | Name | Date |
| --- | --- | --- |
| 2,338,556 | Weldon | Jan. 4, 1944 |
| 2,265,868 | Schonland | Dec. 9, 1941 |
| 2,066,522 | Doherty | Jan. 5, 1937 |